US 6,654,019 B2

(12) United States Patent
Gilbert et al.

(10) Patent No.: US 6,654,019 B2
(45) Date of Patent: Nov. 25, 2003

(54) PANORAMIC MOVIE WHICH UTILIZES A SERIES OF CAPTURED PANORAMIC IMAGES TO DISPLAY MOVEMENT AS OBSERVED BY A VIEWER LOOKING IN A SELECTED DIRECTION

(75) Inventors: Scott Gilbert, Tucson, AZ (US); David J. Kaiman, Portland, OR (US); Michael C. Park, Portland, OR (US); G. David Ripley, Portland, OR (US)

(73) Assignee: iMove, Inc., Portland, OR (US)

( * ) Notice: Subject to any disclaimer, the term of this patent is extended or adjusted under 35 U.S.C. 154(b) by 47 days.

This patent is subject to a terminal disclaimer.

(21) Appl. No.: 10/003,399

(22) Filed: Oct. 22, 2001

(65) Prior Publication Data

US 2002/0063709 A1 May 30, 2002

Related U.S. Application Data

(63) Continuation of application No. 09/310,715, filed on May 12, 1999, now Pat. No. 6,337,683.
(60) Provisional application No. 60/085,319, filed on May 13, 1998.

(51) Int. Cl.[7] .............................................. G06T 13/00
(52) U.S. Cl. ........................ 345/474; 345/629; 348/36
(58) Field of Search ................................ 345/418, 629, 345/474; 348/36, 38, 37, 39

(56) References Cited

U.S. PATENT DOCUMENTS

| 3,909,121 A | 9/1975 | Cardoso ...................... 352/44 |
| 4,807,158 A | 2/1989 | Blanton et al. | |

(List continued on next page.)

OTHER PUBLICATIONS

QuickTime VR—An Image based Approach to Virtual Environment Navigation, Shenchang Eric Chen, Apple Computer Inc., ACM–0–89791–701–4/95/008.*

"The Quicktime VR Book—Creating Immersive Imaging on Your Destop" by Susan A. Kitchens, Peachpit Press, ISBN: 0–201–69684–3.

*Primary Examiner*—Mano Padmanabhan
*Assistant Examiner*—Enriquel L. Santiago
(74) *Attorney, Agent, or Firm*—Fenwick & West LLP

(57) ABSTRACT

Movement through multi-dimensional space is simulated using a series of panoramic images which are projected or displayed in sequence. The user's direction of view, that is the selected view window, is maintained as the series of images is projected or displayed. Motion in directions other than forward or reverse is simulated by utilizing "branch" points in the sequence. Each path from a branch point simulates motion in a different direction. Branch points are generally indicated to a viewer by visual indicators called "hot spots"; however, branch points may also be hidden and activated in response to the viewer's selected direction of view. If a branch point is indicated by a visual indicator, a user can select motion in a desired direction by clicking on a "hot spot".

In order to conserve storage space, the image representing each panorama can be stored in a compressed format. Only the portion of the panorama necessary to create a "view window" that is, the portion of the image displayed in response to the user's direction of view, is decompressed at view time. An index methodology is used to store the panoramic images. Use of the indexing methodology allows the images to be retrieved in both the forward and backward direction to simulate movement in either direction. Sound is provided in a special format, so that special effects can be provided based on the user's point of view and dependent upon the direction of motion selected by the user.

28 Claims, 12 Drawing Sheets

Microfiche Appendix Included
(36 Microfiche, 2451 Pages)

U.S. PATENT DOCUMENTS

| | | | |
|---|---|---|---|
| 4,853,764 A | | 8/1989 | Sutter .......................... 358/3 |
| 5,023,725 A | * | 6/1991 | McCutchen .................. 348/38 |
| 5,130,794 A | | 7/1992 | Ritchey |
| 5,235,198 A | | 8/1993 | Stevens et al. |
| 5,329,616 A | | 7/1994 | Silverbrook |
| 5,355,450 A | | 10/1994 | Garmon et al. |
| 5,495,576 A | | 2/1996 | Ritchey |
| 5,541,773 A | | 7/1996 | Kamo ....................... 359/692 |
| 5,563,649 A | | 10/1996 | Gould et al. ................. 348/17 |
| 5,650,814 A | | 7/1997 | Florent et al. |
| 5,657,073 A | | 8/1997 | Henley |
| 5,677,981 A | | 10/1997 | Kato et al. |
| 5,684,937 A | | 11/1997 | Oxaal |
| 5,703,604 A | | 12/1997 | McCutchen .................... 345/8 |
| 5,708,469 A | * | 1/1998 | Herzberg ..................... 348/37 |
| 5,729,471 A | | 3/1998 | Jain ......................... 364/514 |
| 5,748,121 A | | 5/1998 | Romriell ..................... 341/65 |
| 5,774,569 A | | 6/1998 | Waldenmaier |
| 5,852,673 A | | 12/1998 | Young |
| 5,872,575 A | | 2/1999 | Segal ........................ 345/473 |
| 5,886,745 A | | 3/1999 | Muraji et al. |
| 5,903,782 A | | 5/1999 | Oxaal |
| 5,933,137 A | | 8/1999 | Anderson |
| 5,936,630 A | | 8/1999 | Oxaal |
| 5,990,934 A | | 11/1999 | Nalwa |
| 6,002,430 A | | 12/1999 | McCall et al. |
| 6,043,837 A | | 3/2000 | Driscoll, Jr. et al. |
| 6,058,397 A | | 5/2000 | Barrus et al. ................ 707/104 |
| 6,101,534 A | | 8/2000 | Rothschild |
| 6,118,454 A | | 9/2000 | Oxaal |
| 6,118,474 A | | 9/2000 | Nayar |
| 6,157,385 A | | 12/2000 | Oxaal |
| 6,215,519 B1 | | 4/2001 | Nayar et al. |
| 6,226,035 B1 | | 5/2001 | Korein et al. |
| 6,237,647 B1 | | 5/2001 | Pong et al. |
| 6,243,099 B1 | | 6/2001 | Oxaal |
| 6,252,603 B1 | | 6/2001 | Oxaal |
| 6,271,853 B1 | | 8/2001 | Oxaal |
| 6,323,858 B1 | | 11/2001 | Gilbert et al. |
| 6,323,862 B1 | | 11/2001 | Oxaal |
| 6,337,683 B1 | | 1/2002 | Gilbert et al. |
| 6,346,950 B1 | | 2/2002 | Jouppi |
| 6,567,086 B1 | | 5/2003 | Hashimoto |

\* cited by examiner

| | | | | | | | |
|---|---|---|---|---|---|---|---|
| Fa | Image Data | Audio A | Audio B | Audio C | Audio D | Audio E | Control Info |
| Fb | Image Data | Audio A | Audio B | Audio C | Audio D | Audio E | Control Info |
| Fc | Image Data | Audio A | Audio B | Audio C | Audio D | Audio E | Control Info |
| Fd | Image Data | Audio A | Audio B | Audio C | Audio D | Audio E | Control Info |
| Fe | Image Data | Audio A | Audio B | Audio C | Audio D | Audio E | Control Info |
| Fg | Image Data | Audio A | Audio B | Audio C | Audio D | Audio E | Control Info |
| Fh | Image Data | Audio A | Audio B | Audio C | Audio D | Audio E | Control Info |
| Fi | Image Data | Audio A | Audio B | Audio C | Audio D | Audio E | Control Info |

FIG. 11

PANORAMIC MOVIE WHICH UTILIZES A SERIES OF CAPTURED PANORAMIC IMAGES TO DISPLAY MOVEMENT AS OBSERVED BY A VIEWER LOOKING IN A SELECTED DIRECTION

RELATED PATENT APPLICATIONS

This application is a continuation of application filed Ser. No. 09/310,715 filed May 12, 1999, now U.S. Pat. No. 6,337,683, and a continuation in part of application 60/085,319 filed May 13, 1998. The above listed applications are hereby incorporated herein by reference and priority is claimed to the listed applications.

MICROFICHE APPENDIX INCORPORATED BY REFERENCE

The parent application Ser. No. 09/310,715 included a three part microfiche appendix which is a listing of code for computer programs: There are a total of 36 microfiche with a total of 2451 frames. The microfiche appendix filed in application Ser. No. 09/310,715 is hereby incorporated herein by reference.

FIELD OF THE INVENTION

The present invention relates to photography, digital image processing and to computer graphics. More particularly the present invention relates to a method and system for providing a viewer with a multidimensional view which simulates movement through space or time.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Motion is usually simulated by means of single view movies. Single view movies consist of a series of single photographs which are sequentially projected on a screen. At any time, a single photograph is entirely projected on the screen. Some movie theaters have screens which partially surround the viewer, so that a viewer can turn and look at a different portion of the screen as the movie progresses However, irrespective of where the viewer's attention is focused, in fact the entire image is being projected on the screen. With some equipment single view movies can be stopped and reversed; however, again at a particular time a selected frame is entirely displayed. In summary, traditional movies do not allow a viewer to control the portion of the image which is projected on the screen. Stated differently, with traditional movies a viewer can not control the "view window" through which each image is viewed.

It should be noted that as used herein the term "screen" refers to either a traditional screen onto which an image is projected or an electronic display which projects or displays an image in such a manner that the image can be seen by a viewer.

The technology for producing panoramic images and photographs is well known. Panoramic images are images which represent the visual surroundings from a single location (or view point) of a particular 3D environment. Panoramic images can be photographic, computer-generated (CG), or a composite of photo and CG imagery. Equipment is available which seams together a series of two dimensional conventional images to form a panoramic image. Panoramic images may consist of any field of view such as a full sphere full cylinder, semi-sphere, etc. however, full sphere views are generally preferred. Panoramic images may be in any of the known projection formats, such as equi-rectangular, Mercator, Peters, fisheye, cube, or hemicube, etc. If the field of view is wide enough to warrant, perspective correction may be applied to the portion of a panoramic image displayed in order to remove projection distortions from the given view of the user. Computer programs and systems which allow one to view a selected portion of, to pan, to rotate, etc a panoramic image or photograph in response to the movement of a computer mouse, joystick, keyboard, etc. are commercially available.

Panoramic image (or photographic image) viewing systems are available which provide a number of panoramas (for example views of adjacent rooms in a building) and which allow a user who is viewing one of the rooms to "click" on a door and to thus bring up the panorama of the next room, thereby, in some sense simulating movement into the next room. However, each of the panoramic views in such systems is static and some explicit action on the part of the viewer is required to move on to a different panorama.

U.S. Pat. Nos. 5,023,925 and 5,703,604 describe, and Dodeca L.L.C. located in Portland Oreg. commercially markets, a system for capturing images using a multi lens camera, for seaming the images into panoramas, and for viewing selected portions of the panoramic images.

Other panoramic image or photographic viewing systems are available which initiate a conventional single view motion picture when a user "clicks" on a spot such as a door in a first panoramic view. The single view movie simulates movement into a different location and at the end of the movie, the user is presented with a second panoramic view.

A company named "Warp" located in the Kingdom of Tonga has demonstrated a system wherein a video sequence is captured using a video camera with a fisheye lens which is pointed in the vertical or "up" direction (see, VTV Software Development Kit Reference Manual 2.01 Win95 1996). This approach provides a hemispheric movie in which the user may "pan around" while the movie is playing. In the system demonstrated by Warp, the user views the movie "in sequence", meaning that each frame of the movie is played according to the temporal sequence in which the hemispheric movie was captured. The system demonstrated by Warp was limited to sub-spherical panorama dimensions and the camera was located at a fixed position.

Realistic simulation of movement from one location to another can be provided by three dimensional computer modeling systems, such as those used in some flight simulators. However, such systems are very computationally intensive

SUMMARY OF THE PRESENT INVENTION

The present invention simulates movement through multidimensional space using a series of panoramic images which are projected or displayed in sequence. The user's direction of view, that is the selected view window, is maintained as the series of images is projected or displayed. Motion in directions other than forward or reverse is simulated by utilizing "branch" points in the sequence. Each path from a branch point can simulate motion in a different direction. Branch points are generally indicated to a viewer by visual indicators called "hot spots"; however, branch points may also be hidden and activated in response to the viewer's selected direction of view. If a branch point is indicated by a visual indicator, a user can select motion in a desired direction by "clicking" on a "hot spot".

In order to conserve storage space, the image representing each panorama can be stored in a compressed format. If the images are stored in compressed format, in order to conserve time and processing power, when an image is displayed, only the portion of the panorama necessary to create a "view window" that is, the portion of the image displayed in response to the user's direction of view, is decompressed. Furthermore, the images are stored in a format that does not utilize inter-image compression (such as that used by the MPEG format). Since the images are stored in a format that does not utilize inter-image compression, it is possible to simulate motion in both the forward and backward direction without operating on a series of decompressed images.

An index methodology is used to store the panoramic images. Use of the indexing methodology allows the images to be retrieved in both the forward and backward direction to simulate movement in either direction.

Sound is provided in a special format, so that special effects can be provided based on the user's point of view and dependent upon the direction of motion selected by the user.

BRIEF DESCRIPTION OF THE FIGURES

FIG. 7 shows a series of panoramas stored as a series of compressed key-frames and a file index for sequencing playback of the key-frames.

FIG. 11 is a diagram illustrating the audio information associated with each key frame.

DESCRIPTION OF APPENDICES INCLUDED IN THIS APPLICATION

Appendix A is a print out of computer code for retrieving images and correcting the perspective of images in a pan movie.

Appendix B is a sample of link control file for a pan movie.

Appendix C is a print out of computer pseudocode for linking sequences of images to form a pan movie.

Appendix D (on microfiche and incorporated herein by reference ) is a printout of computer code for the following three computer programs:"

1) A program which seams images and builds pan movies. This program takes six single view images and seams then into a panorama, and then connects a series of panoramic images into a pan movie.
2) A program which inserts hot spots into panoramas.
3) A program which displays a series of panoramic images as a pan movie.

DESCRIPTION OF A PREFERRED EMBODIMENT

In order to simulate movement through multi-dimensional space, one must first capture a series of panoramic images, the panoramic images must be stored as frames and then the appropriate view window from selected frames must be displayed in an appropriate sequence.

Figure 1:
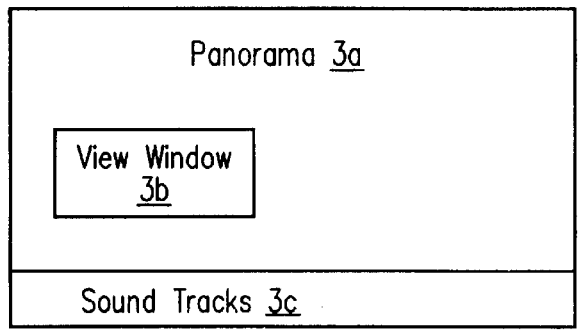
FIG. 1 illustrates a key frame (that is, panoramic image) with a view window and associated sound tracks.

A panoramic image provides data concerning what is visible in any direction from a particular point in space. At any particular time a viewer or user can only look in one direction. The direction or point of view of a viewer or user determines the "view window", that is, the part of a panoramic image which is projected on a screen at a particular time. FIG. 1 shows a key frame (i.e. a panoramic image) or a panorama 3a. Panorama 3a has a view window 3b which corresponds to a portion of panorama 3a. Panorama 3a also has associated therewith a number of sound tracks 3c. It is noted that for ease and clarity of illustration, no attempt has been made to illustrate in FIG. 3 the well know fact that there is a difference in perspective between what is displayed in a view window and what is stored in a flat section of a rectilinear spherical panorama.

Figure 2:
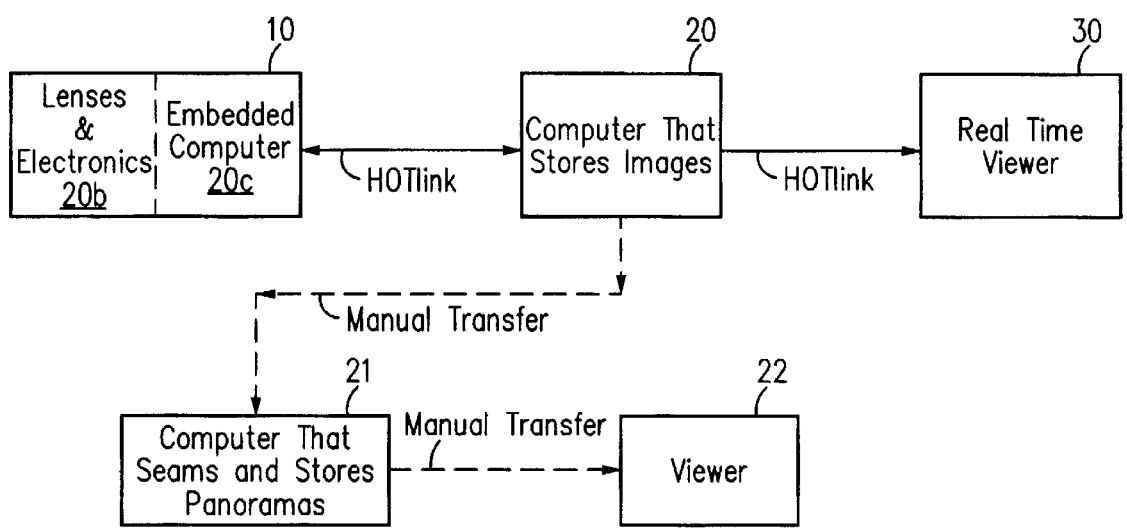
FIG. 2 is a block diagram showing the major components in the preferred embodiment.

FIG. 2 is an overall diagram of a preferred embodiment of the invention. A camera unit 10 captures images. The images are sent to a computer 20 which stores the images. Computer 20 also controls camera unit 10. If desired the images can be viewed by a real time viewer 30. The images are transferred from computer 20 to off line computer 21. Computer 21 seams the images into panoramas, transforms the images to equirectangular format, adds other information to the images, compresses the panoramas, and links the panoramas into a pan movie. Finally the pan movie is viewed on viewer 22.

Figure 3A:
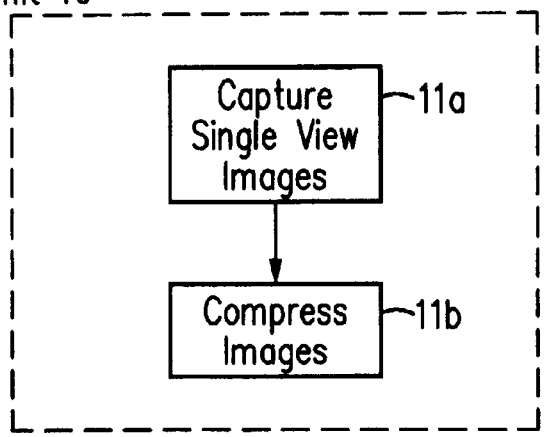
FIGS. 3A to 3D shows the sequence of operations performed by the various components in the system shown in FIG. 2.
Figure 3B:
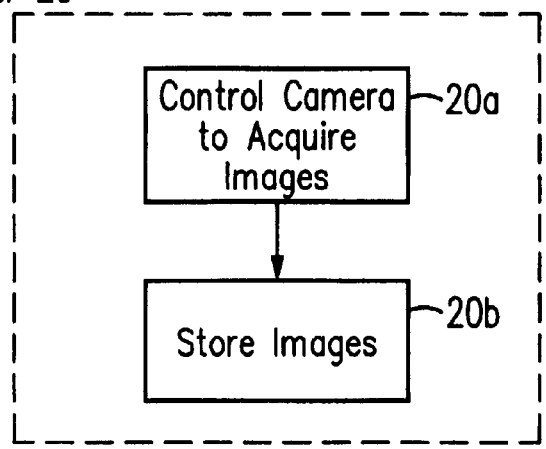

The operations performed by the units in FIG. 2 are shown in FIGS. 3A, 3B, 3C and 3D. As shown in FIG. 3A, block 11a, camera unit 10 captures a number of single view images. As indicated by block 11b these images are compressed and sent to a computer 20. Computer 20 activates camera 10 to capture the images as indicated by block 20a. It then accepts the images as indicated by block 20b and stores them.

Figure 3C:
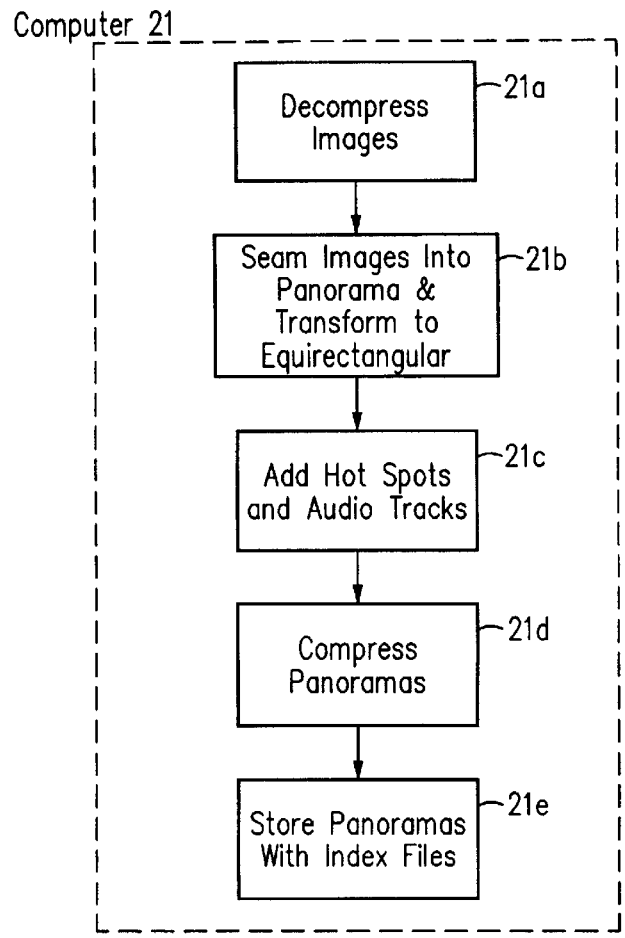
Figure 3D:
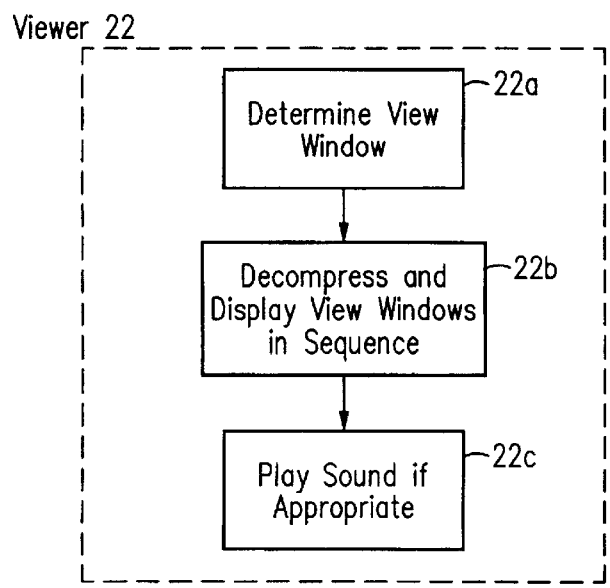

The stored images are manually transferred to off line computer 21 which is programmed to perform the operations shown in FIG. 3C. First the images are decompresses as indicated by block 20a so that they can be manipulated. Next the single view images are seamed into a panorama and transformed to equirectangular format as indicated by block 21b. Hot spots which indicate break points in a sequence of images and sound tracks are added next as indicated by block 21c. Finally the images are compressed as indicated by block 21d and stored with an index file as indicated by block 21e. Each panorama is termed a "key frame". A series of key frames (or more precisely a sequence of view windows) projected in sequence is a pan movie.

A viewer program in viewer computer 22 is used to view the pan movies. The viewer 22 displays in sequence a series of images, that is, a series of key frames. For each key frame displayed the viewer 22 determines an appropriate view window as indicated by block 22a. The portion of the key frame which corresponds to the view window is then de-compressed and displayed as indicated by block 22b. As indicated by block 22c, sound is played if appropriate.

It is noted that the operations indicated by blocks 20a, 20b, 21a to 21e, 22a, 22b, and 22c are implemented by means of computer programs which perform the functions shown. Computer programs are given in appendices A, B, C, and D.

Figure 4A:
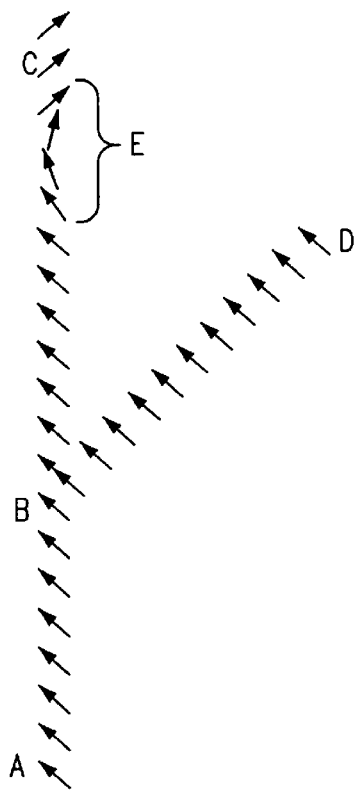
FIG. 4A illustrates a sequence of frames which constitute a panoramic movie.

FIG. 4A represents or illustrates a sequence or series of panoramic images in a pan movie. Each arrow in FIG. 4A represents one key frame. At any particular time, only a part (i.e. the view window) from one key frame is visible to a user or observer. The direction of each arrow indicates the direction of view, that is, the view window or part of the key frame that is projected on a screen for observation. The arrows in FIG. 4A are meant to represent a particular "view window" from each key frame. As indicated by the change in direction of the arrows in the area of FIG. 4A designated by the letter E, a viewer can change his direction of view as the pan movie progresses. It is noted that when a user is viewing a panorama, a user can point toward the top or bottom of the screen and thus can view images located in a 360 degree circle from top to bottom in addition to the horizontal directions illustrated by the arrows shown in FIG. 4A.

The sequence of images begins at the point or at the key frame indicated by the letter A and the sequence proceeds to the point or key frame indicated by the letter B. At this point the viewer can select to either go toward point C or toward point D. The selection may be made by "clicking" on a designated "hot spot" in the panorama designated B or it may be made depending on some other criteria or action by the user. An important point is that at the branch point B, the direction of view (indicated by the direction of the arrows) remains the same irrespective of which path of travel is chosen. The view from the first frame after the branch point will be almost identical in both paths. As time progresses and the viewer moves further from the branch point, the view will gradually change. This is the effect that a person experiences when one arrives at a dividing point in a path. When a person takes the first step on a branching path, the persons field of view remains practically identical.

It is noted that at branch point B, the arrows are not pointing in the direction of the path leading to point D. Normally, a viewer would be looking in the direction of a branch point when the viewer selects to travel in the direction of the branch point. Thus, a viewer looking in the direction of the arrows shown in FIG. 4A would normally continue to point C rather than selecting the path to point D.

Sequences of key frames can either be joined at branch points such as branch point B or alternatively a branch point may be located at the end of a sequence of key frames. That is, a branch point may be located at the terminal frame of a sequence of key frames. Such a branch point could have two alternative sequences, one of which can be selected by a user by clicking on one of two hot spots. Alternatively at the end of a sequence of key frames, there can be an implicit branch point. At such an implicit branch point a new sequence of frames would be selected by the system without any action by the user.

There is a one to one ratio of key frames to possible user positions. Hence, there exists a correlation between frame rate and user motion speed. If the user is moving through the environment, every frame displayed is a new key frame. The faster the frame rate for a given frame spacing, the faster the user travels. Given a fixed frame rate, the user's travel speed may be dictated by the relative spacing of key frames. The closer the key frames are, the slower the user will travel. For example, for a travel speed of approximately 5 mph and a playback frame rate of 15 fps, individual panoramic frames should be captured at about 6 inch increments. The math is as follows: (5 miles/hour*63,360 inches/mile)/(3600 sec/hour*15 frames/sec)=6 inches per frame. When the movie is being displayed, speed of travel can be increased by skipping some of the frames (for example if every other frame is skipped the speed of travel is doubled). Skipping frames reduces the rate at which frames need be sent to the viewer and thus reduces the bandwidth required.

In addition to the spacing of key frames to achieve different travel speeds, the orientation of individual key frames may be adjusted in order to achieve a desired motion effect, such as gate, slumber, waddle, crawl, skip, etc. The orientation of a key frame is defined to be the default view (or point of focus) of the user within the panoramic image if no other point of view is specifically selected.

Figure 4B:
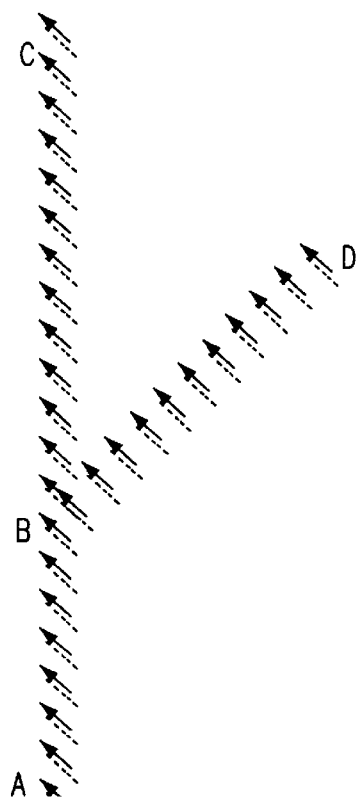
FIG. 4B illustrates the sound track associated with the frames of a panoramic movie.

Sound can accompany the visual effect provided by pan movies. FIG. 4B indicates that each key frame can have one or more associated digital sound tracks. The digital sound tracks are indicated in FIG. 4B by the dotted line which is associated with each of the arrows. As shown in FIG. 11 and described later, there can be several different sound tracks associated with each key frame.

Figure 5A:
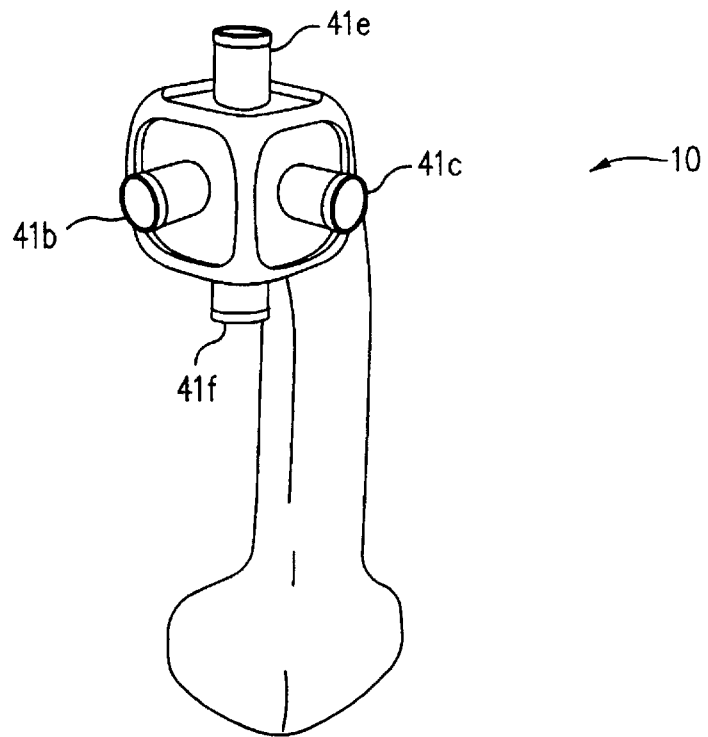
FIG. 5A is a perspective view of the multi lens hand held unit that captures a series of panoramic images.
Figure 5B:
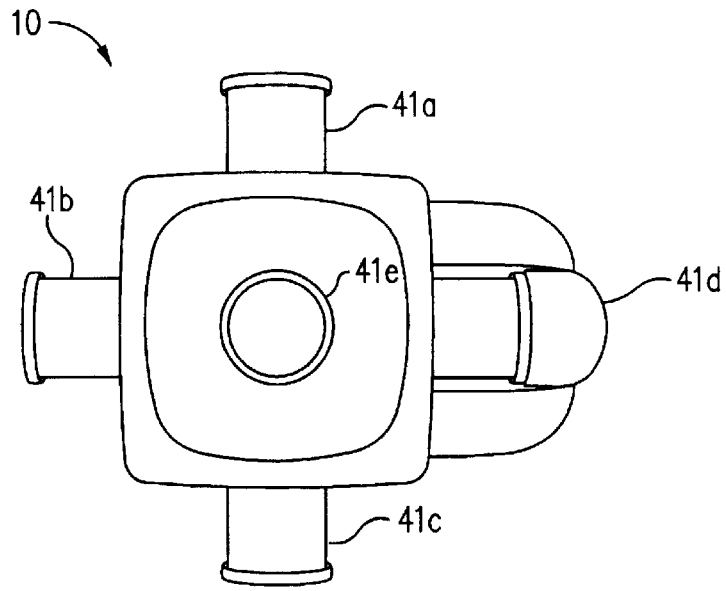
FIG. 5B is top view of the multi lens hand held unit shown in FIG. 5A.

FIG. 5A is a perspective view of the six lens camera unit 10 which is used to digitally capture panoramic images, that is, key frames. FIG. 5B is a top view of camera 10 which is included to show that the unit has six lenses 41a to 41f. Each lens 41a to 41f has a 110 degree field of view. The images captured by lenses 41a to 41f are transmitted to computer 20 through a serial connection. Computer 21 "seams" the individual images from lenses 41a to 41f into panoramic images or key frames, compresses the key frames and stores them for future display. Additionally, a real time viewer can 30 can be used to view the images as they are being captured and seamed.

In the preferred embodiment the connection from camera unit 10 to computer 20 and from computer 20 to real time viewer 30 is a "HOTlink" serial bus. Such connections are commercially available from suppliers such a Cypress Semiconductor Corp. or from Dataforth Corporation which is a division of Burr-Brow Company. Alternatively other types of high speed connections could be used. For example the connection could be a standard SCSI connection.

Figure 6:
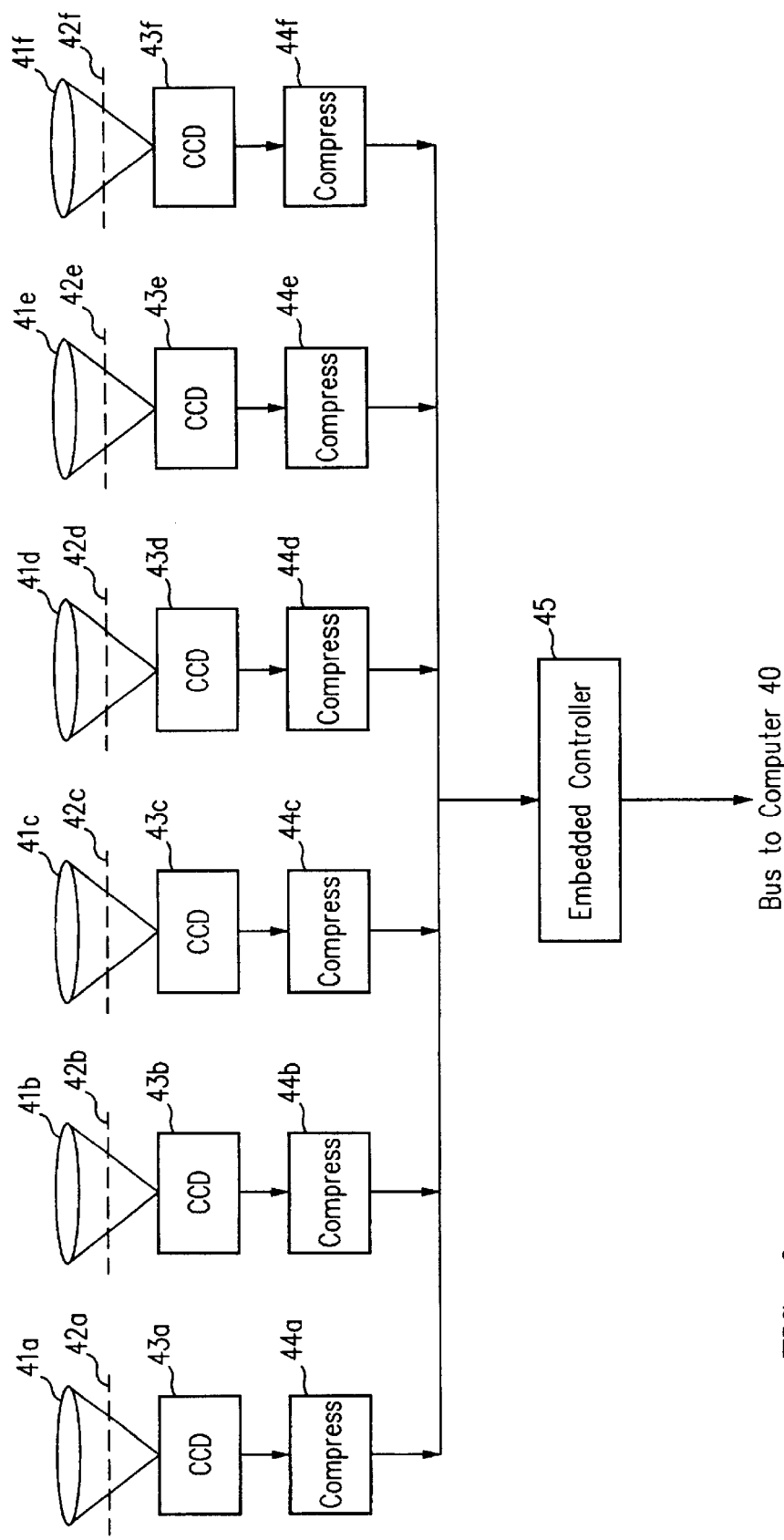
FIG. 6 is a block diagram of the electronic components in the hand held unit shown in FIGS. 5A and 5B.

FIG. 6 shows the electronic components in camera 20. The components associated with each lens 41a to 41f are substantially identical to the components in commercially available digital cameras. The internal operation of the camera 20 is controlled by a conventional embedded programmed computer 45 which, for example, may be a model 29000 computer available from Advanced Micro Devices Corporation. Many different suitable embedded processors are commercially available. Embedded computer 45 receives commands from computer 20 which has IO units which allow an operator to enter commands. For example computer 20 sends commands to computer 45 which set the aperture of the lenses 41a to 41f and which starts and stops the operation of the camera. While computer 20 sends general commands to computer 45 such as set aperture, start, stop, etc., computer 45 sends to detailed commands which control CCD arrays 43a to 43f and which control compression chips 44a to 44f. Such commands are conventional.

Each of the lenses 41b to 41f has a set of associated components similar to the components associated with lens 41a. The following will discuss the components associated with lens 41a. It should be understood that the other lenses 41b to 41f have a similar sets of components.

The image from lens 41a is focused on a CCD (Charge Coupled Device) array 43a. CCD array 43a captures the image from lens 41a and send this image to embedded computer 45. CCD arrays 43a is controlled and operated by embedded computer 45. By resetting and reading the CCD array 43a in a particular time period, the embedded computer 45 in effect controls or provides an electronic shutter for lens 41a. The electronic shutters associated with each of the lenses 40a to 40f open and close simultaneously. Each CCD array 43a to 43f captures 30 images per second under normal operation.

The output of CCD array 43a is fed into a JPEG data compression chip 44a. Chip 44a compresses the image from lens 41a so that the image can be more easily transmitted to computer 40. The output from compression chip 41a fed to an embedded controller 45 which transmits signals to computer 40 on a serial time slice basis.

The lenses 41 and the CCD arrays 43, and are similar to the components found in commercially available digital cameras. JPEG compression chips 44 and embedded computer 45 are also commercially available components. For example such components are available from suppliers such as Zoran Corporation or Atmel Corporation.

The electronic shutters associated with lenses 41 operate at 30 cycles per second and hence computer 21 receives six images (one from each lens) each ⅓₀th of a second. The six images received each ⅓₀th of a second must be seamed and transformed to equirectangular format to form one panorama as indicated by step 21b in FIG. 2.

While the specific embodiment of the invention shown herein utilizes a digital camera to take the initial single view images which are compressed and sent to computer 20 for storage, it should be understood that one could use a variety of other types of cameras to take these initial images. For example the images simultaneously taken from a number of lenses could be recorded on tape for later processing by off line computer 21.

The seaming operation is done by the program in computer 21. In general the seaming operation connects the individual images into a panoramic image by finding the best possible fit between the various individual images. The process of seaming images into a panoramic image is known. For example U.S. Pat. No. 5,694,531 describes seaming polygons into a panorama which has a low root-mean-square error. A computer program which can seam the six images from lenses 41a to 41f of camera 20 into a panorama is given in Appendix D.

After the seaming operation is complete each seamed image is a panoramic image (called a panorama) and each panorama is a frame of a pan movie. Prior to storage the seamed images are compressed so as that the file size will be manageable. A commercially available compression program known as "Indeo" is used to compress the images. The Indeo program was developed by and is marketed by the Intel Corporation. The Indeo compression program provides a mode of operation which does not utilize any inter-frame compression. The no inter-frame compression mode of the Indeo program is used with the present embodiment of the invention. Since there is no inter frame compression, the key frames can be accessed and viewed in either the forward or the reverse direction. Furthermore, only the portion of a panorama required for a particular view window is decompressed, thereby saving time and computational resources.

Figure 7:
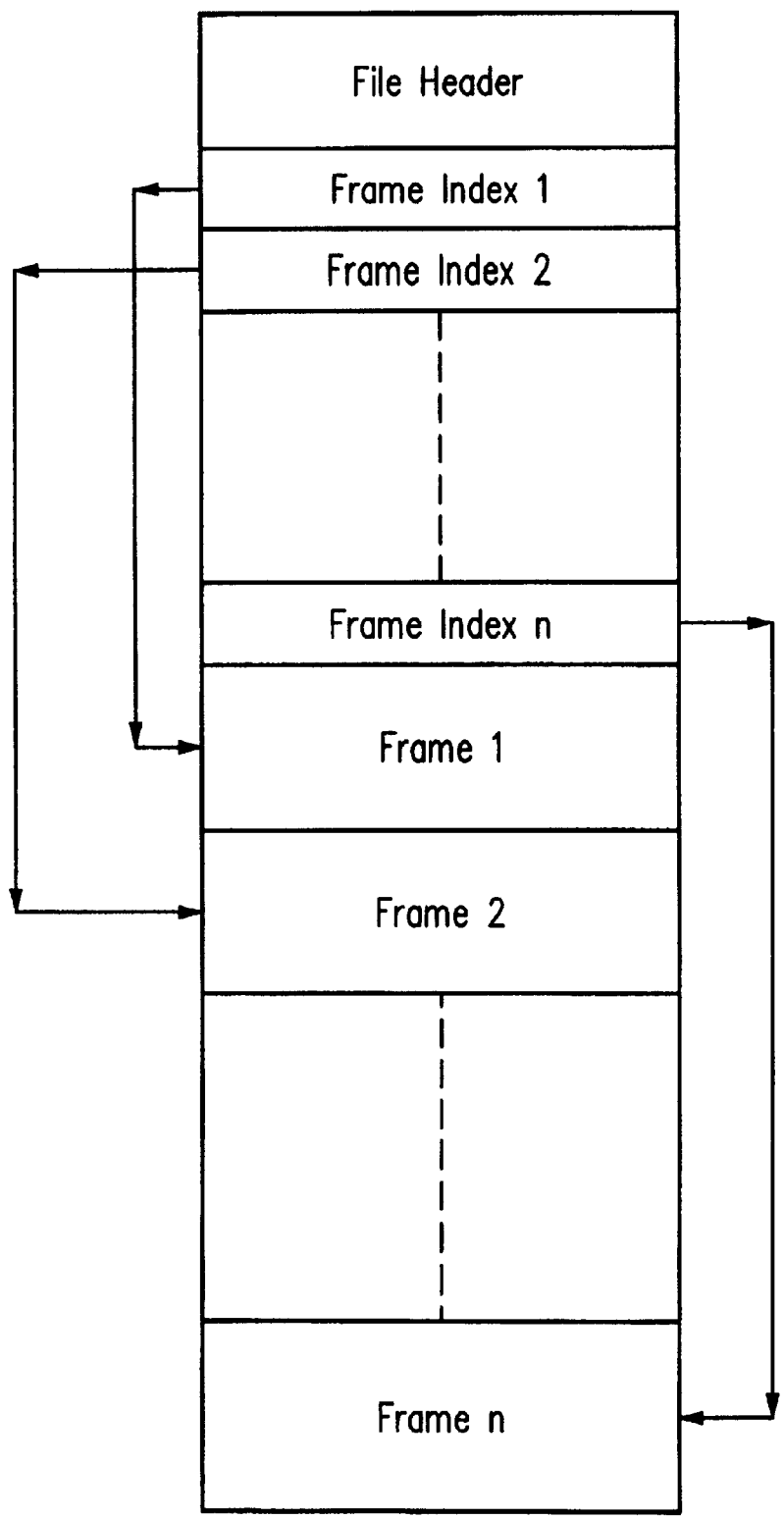
FIG. 7 is a diagram of a file containing a pan movie.

The compressed panoramic images are stored in files on computer disks, tape or compact discs (CDs). Each file includes a header and an index as shown in FIG. 7. The header includes information such as the following:

| File Type Tag: | |
| --- | --- |
| File Size: | (total bytes used by the file) |
| Index Size: | (Number of entries in frame Index) |
| Max Frame Size: | (total bytes used by largest compressed frame) |
| Codec: | (Codec used to compress frames. |

After the file header, a frame index is provided (see FIG. 7). Each frame index points to the location of the associated frame as indicated by the arrows in FIG. 7. Thus, individual frames can be read in any order by obtaining their location from the frame index.

The indexing mechanism would not be necessary if the key frames were always going to be used in frame order. However, in the present embodiment, the system can play the key frames which comprise the pan movie in either forward or backward direction. Hence the system must be able to locate individual frames quickly in any order. Furthermore, it is desirable that the system be able to locate a key frame with only a single disk access. Consider the situation were the user is moving "backward" (in the opposite direction of the key frame disk storage) at a fast travel speed (to increase speed of movement some key-frames are skipped). Without a key frame directory, the disk would have to be searched in a "reverse-linear" manner in order to find and load the next appropriate key frame. With a key frame directory, the next key frame location is located immediately, and loaded with a single disk access (given the directory itself is stored in RAM memory).

As indicated in FIG. 4A, a viewer can branch from one sequence of images to another sequence of images. This is indicated by branch point B in FIG. 4A. By branching a user in effect changes the direction of the simulated travel. A user indicates a desire to change direction by "clicking" on a visible "hot spot" or by otherwise activating a hidden hot spot. A visible hot spot can be indicated by any type of visible symbol that is visible in a view window. For example a hot spot may be indicated by a bright red dot in the view window. Alternatively, a hot spot may be indicated by the fact that the cursor changes to a different shape when the cursor is over a hot spot.

It is noted that not all visually apparent alternate paths visible in any panorama are actually available as a pan movie branch. For example, at a street intersection, branches may not be provided to all visible streets. Care must be taken to insure that a viewer is given an indication of the branch points that are actually available to the viewer.

At a playback rate of 30 frames per second a user would have to be very "fast" (i.e. it would in fact be practically impossible) for a viewer to see and click on a hot spot that appears on a single frame. Without advanced notice, the viewer would have great difficulty actually taking a specific action to activate a branch during a specific single frame since in normal operation a particular frame is only displayed for about ⅟₃₀th of a second. In order to be effective and user friendly a user must be given an early indication of a upcoming branch opportunity that requires user action. A hot spot in a pan movie must be visible by a viewer in a relatively large number of key frames. For example a hot spot might be visible in the thirty key frames that precede (or follow for reverse operation) a branch point.

Figure 8:
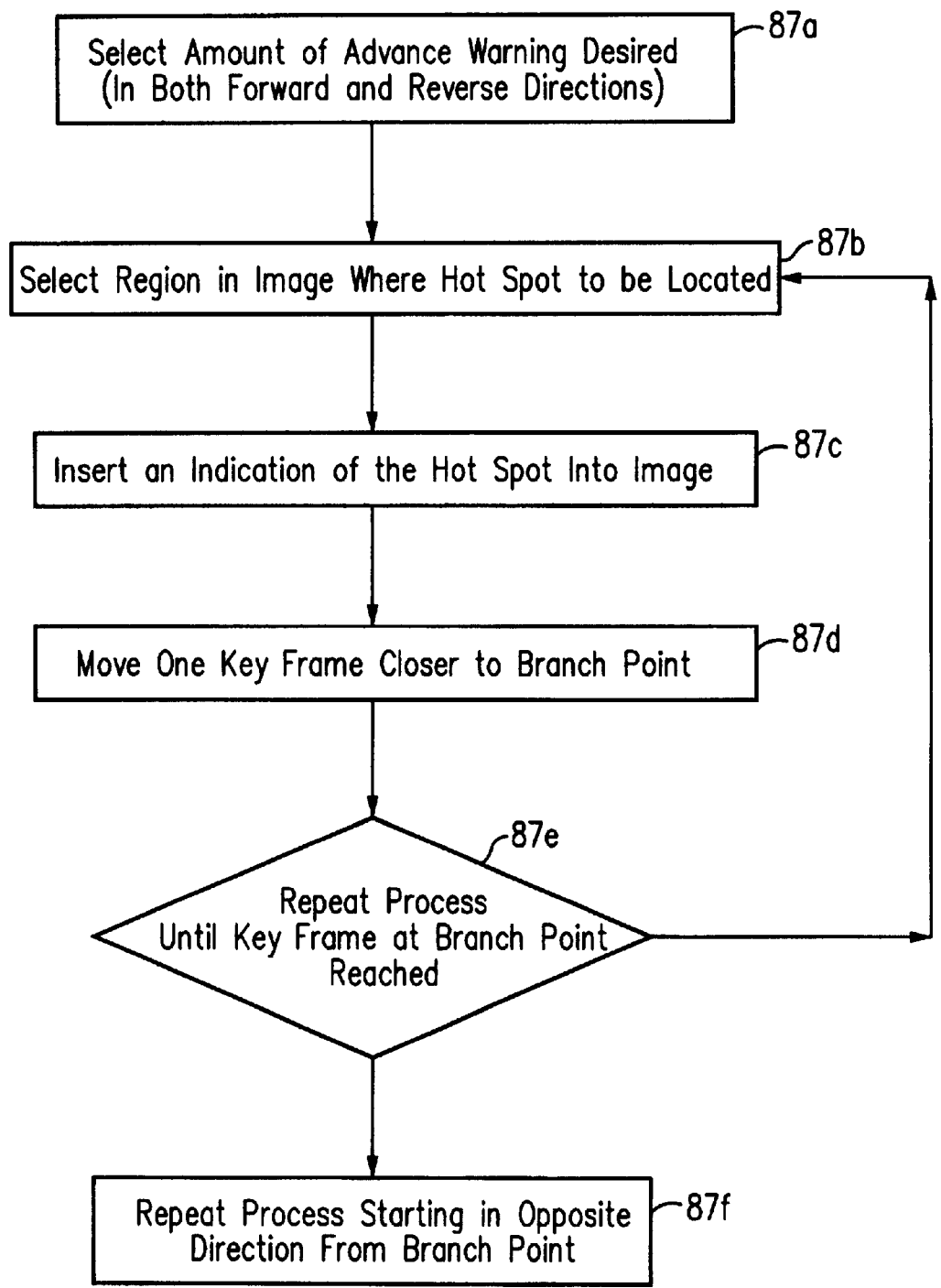
FIG. 8 is a block diagram of a program for inserting hot spots in a pan movie.

Hot spots are inserted into a pan movie in the manner illustrated in FIG. 8. The hot spots are inserted into the key frames by computer 21 before the frames are compressed as indicated by blocks 21c and 21d in FIG. 3C. It is noted that hot spots may be inserted into a pan movie by altering the original panoramic image so that it includes the hot spot or alternately by providing a overlay image which contains the hot spot image. If an overlay is used, the overlay image needs be projected at the same time as the original image. As indicated by block 87a one must first determine how much in advance one wants to warn the user. If a hot spot is to have a particular size at the time action is needed, when viewed in advance (i.e. from a distance) the hot spot will be much smaller. As indicated by block 87b, in order to insert hot spots in a pan movie, one must select the region where the hot spot is to be located. In general this will be in a view looking toward the direction where the branch will take place. The hot spot is then inserted into the panorama by modifying the images. The hot spot may be indicated by a light colored outline superimposed over the region. The area within the outline may be slightly darkened or lightened. The object is to highlight the region without obscuring the image itself. Various other alternative indications can also be used.

The process repeats as indicated by blocks 87d and 87e until the key frame at the branch point is reached. Finally the process is repeated from the opposite direction from the branch point so that the branch point will be visible if the pan movie is shown in the reverse direction.

The changes to the individual key frames may be made manually with a conventional image editor, or the process can be automated by a program designed just for this purpose. Computer code which implements a hot spot editor by performing the steps shown in FIG. 8 is given in Appendix D.

In order to avoid unnecessary user intervention, "hidden" hot spots may be added to connect multiple pan movies. A hidden hotspot is one that does not need to be manually selected by the user. With a hidden hot spot, if the user "travels" into a particular key frame which has a hidden hot spot, and the user is "looking" in the hot spot's general direction, then the system will react based upon the user's implicit selection of the hotspot and the user will be sent along the path directed by the hot spot.

Figure 9A:
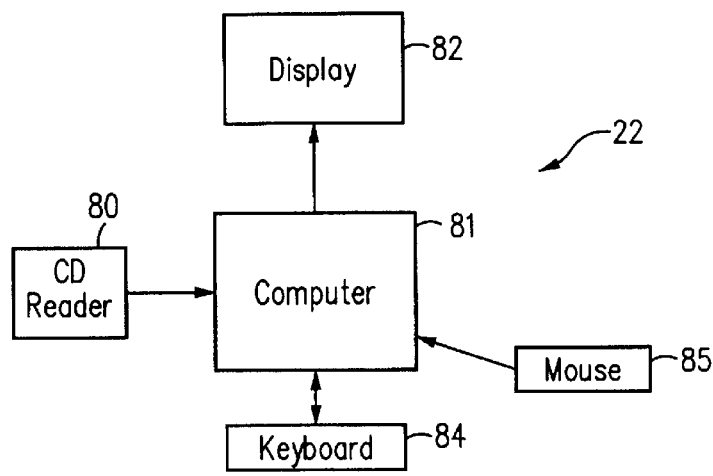
FIG. 9A is a block diagram of a system for playback of a 3-D panoramic movie according to the invention.

FIG. 9A is a block diagram of the viewer 22 which plays or displays pan movies. The main components of the viewer 22 are a CD disk reader 80, a computer 81, a display 82, a keyboard 84 and a mouse 85. Computer 81 reads key frames from disk 80 and displays the view widow from each key frame on display 82. The operator or user utilizes mouse 85 to indicate a view direction. The view direction determines the view window which is displayed on display 82 by computer 81. A program which implements blocks 22a to 22c (shown in FIG. 3D) is stored in and executed by computer 81.

Figure 9B:
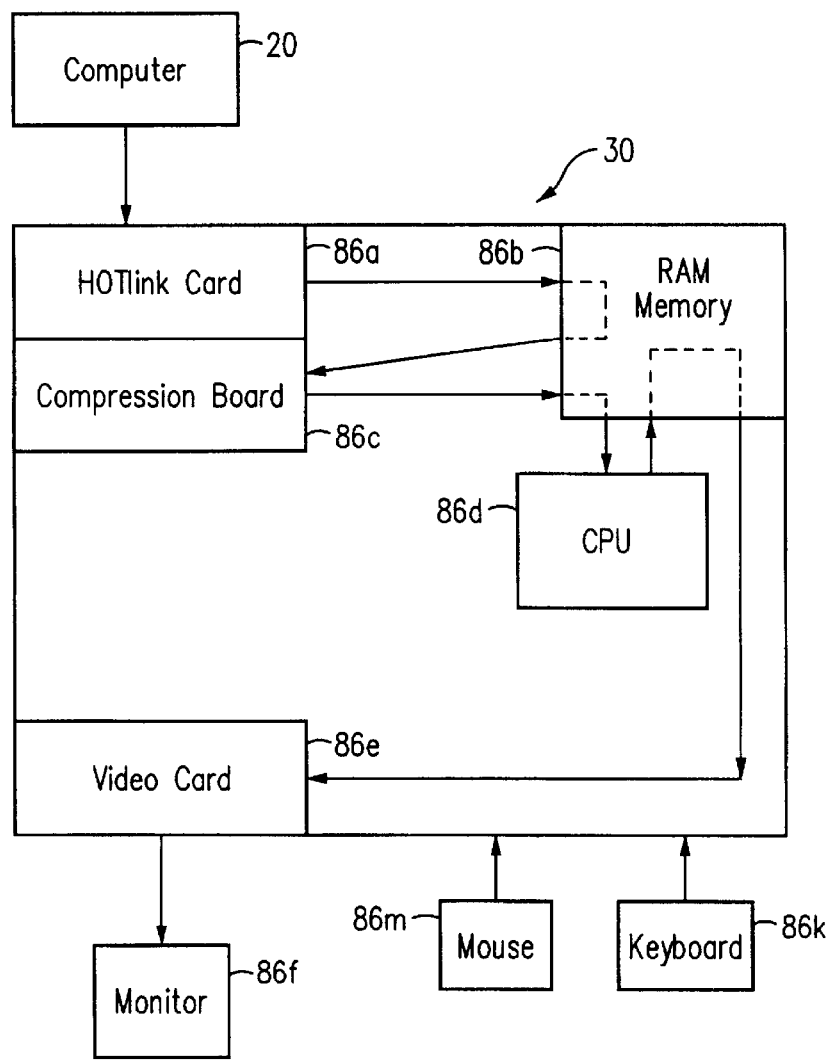
FIG. 9B is a block diagram of a real time viewing unit.

FIG. 9B is a block diagram of the real time viewer 30. As an option, the images captured by camera 10 can be viewed in real time. Images are transferred from computer 21 to viewer 22 in real time. The transfer is by means of a HOTlink bus to HOTlink card 86a. The images go from card 86a to RAM memory 86b and then to decompression card 86c which does the de-compression. From the de-compression board 86c the images go back to memory and then to CPU 86d which combines i.e. seams the images as necessary and transfers them to video card 86e which displays them on monitor 86f. Viewer 30 is controlled via a conventional mouse 86m and keyboard 86k.

Figure 10:
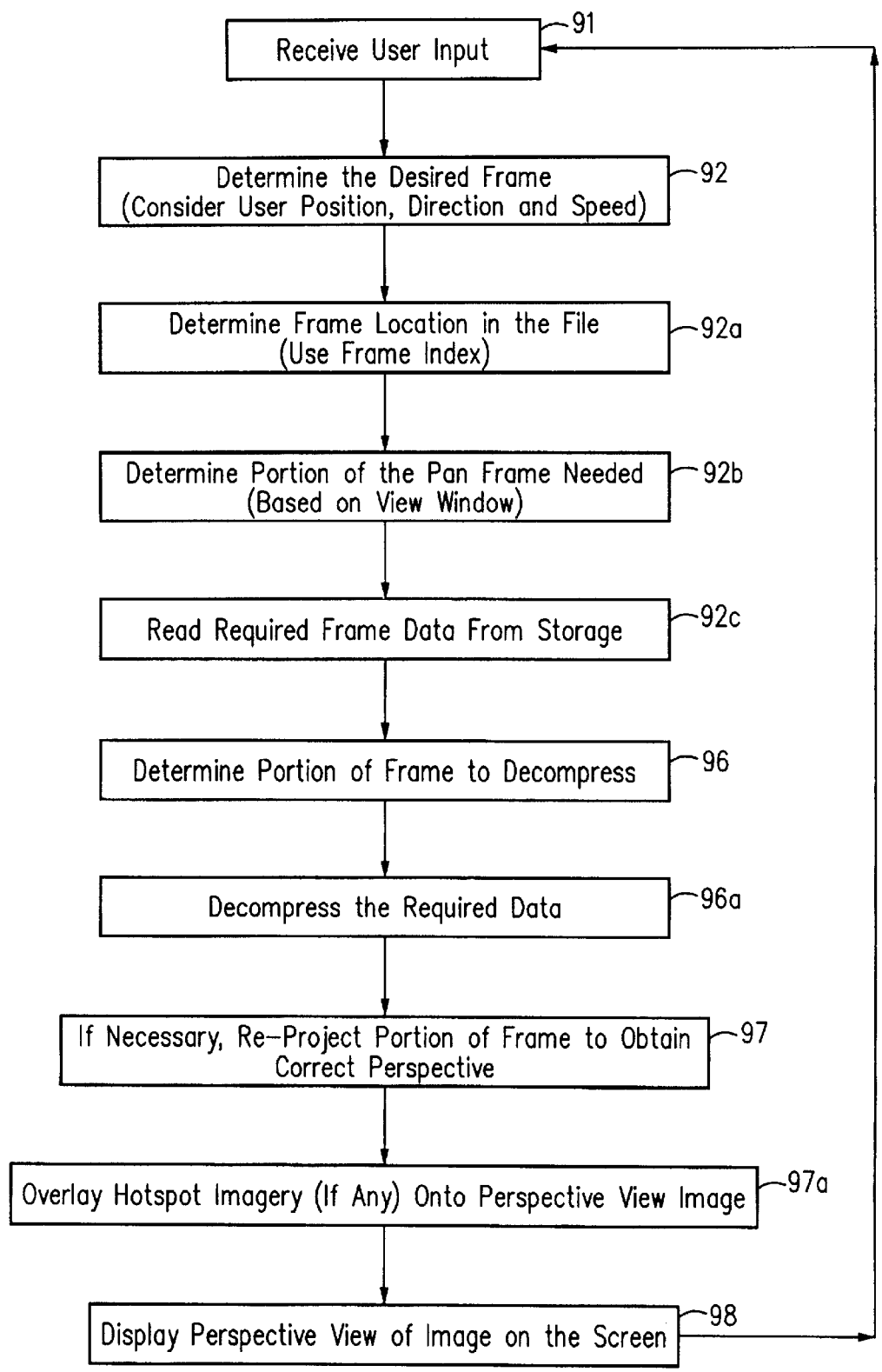
FIG. 10 is a flowchart of the program for viewing a 3-D movie containing a sequence of panoramas according to the invention.

FIG. 10 is block diagram of a program for displaying pan movies. The program shown in block diagram in FIG. 10 is executed by the computer 81 in FIG. 9A. The process begins at block 91 with user input. The user must indicate a start location (at the beginning of the process this would normally be the first frame in the movie). The user must also specify direction of motion, speed and direction of view. As indicated by blocks 92, 92a, 92b and 92c the system determines and then reads the appropriate pan frame data. As indicated by block 96 and 96a, the system determines the portion of the pan frame that is in the selected view window and that portion of the frame is decompressed. As indicated by blocks 97 and 97a, the image is re-projected to obtain a perspective view. If the hot spots have not been placed on the actual key frames but are contained in a separate file, the hot spot imagery is overlaid on the image. Finally, as indicated by block 98, the part of the image which constitutes the view window is projected on the screen.

As a user travels, the next required key frame is determined by the current user position and direction of travel. The location of this key frame within the file of images is determined via the file index directory; and the key frame is loaded into RAM memory, decompressed, and displayed. To increase performance, only the view window (depending on current user view) portions of the key frame need be loaded into RAM. If for ease of programming the entire key frame is loaded into memory, only view window portions of the key frame need be decompressed. If the entire key frame is compressed as a whole, then a de-compressor supporting "local decompression" is more efficient, e.g., Intel Indeo. To determine the portion of the panorama needed to display a particular view, each of the corner coordinates of the perspective view plane (display window) is converted to panorama coordinates. The resulting panorama coordinates do not necessarily represent a rectangle, therefore the bounding rectangle of these panorama data is needed to derive a perspective view at a given view orientation.

Once the corners of the desired bounding rectangle are determined the Indeo de compression program is instructed to decompress only that portion of the key frame needed for the particular view window. In order to do this, the program must call the Video For Windows function ICSetState prior to decompressing the frame. The C code to accomplish this follows.

```
#include "windows.h"
#include "vfw.h"
#include "vfw_spec.h"
extern   HIC                       hic;           // Opened CODEC (IV41);
extern   RECT                      *viewRect;     // Determined elsewhere
static   R4_DEC_FRAME_DATA         StateInfo;
void     SetRectState
(
         HIC       hic;             // Opened CODEC (IV41);
         RECT      *viewRect;       // Local Rectangle of interest
)
{
         R4_DEC_FRAME_DATA     StateInfo;
         memset(&StateInfo,0,sizeof(R4_DEC_FRAME_DATA));
         StateInfo.dwSize = sizeof(R4_DEC_FRAME_DATA);
         StateInfo.dwFourCC = mmioStringToFOURCC("IV41",0); // Intel Video 4.1
         StateInfo.dwVersion = SPECIFIC_INTERFACE_VERSION;
         StateInfo.mtType = MT_DECODE_FRAME_VALUE;
         StateInfo.oeEnvironment = OE_32;
         StateInfo.dwFlags = DECFRAME_VALID | DECFRAME_DECODE_RECT;
         StateInfo.rDecodeRect.dwX = min(viewRect->left,viewRect->right);
         StateInfo.rDecodeRect.dwY = min(viewRect->top,viewRect->bottom);
         StateInfo.rDecodeRect.dwWidth = abs((viewRect->right-viewRect->left)+1);
         StateInfo.rDecodeRect.dwHeight = abs((viewRect->bottom-viewRect->top)+1);
         ICSetState(hic,&StateInfo,sizeof(R4_DEC_FRAME_DATA));
}
```

If the projection used to store the pan-frame is such that there exists a discontinuity in pixels with respect to the spherical coordinates they represent, then the local region required may be the combination of multiple continuous regions. For a full cylinder/sphere equirectangular projection (centered about 0 degrees), the left pixel edge represents −180 degrees and the right pixel edge represents 180 degrees. In spherical coordinates, −180 degrees is the same as 180 degrees. Therefore, the discontinuous left/right pixels represent a continuous "wrap-around" in spherical coordinates.

The math to determine the portion of the source key-frame panorama needed for a particular view window depends on the projection used to store the panorama. Optionally, the viewer may predict the next key-frame to be loaded (depending on user travel direction and speed), and pre-load it in order to increase performance. For an equirectangular projection of a full sphere panorama frame, the equations for determining the required portion are as follows: where:

Scaler variables are lower case, vectors are bold lower case, and matrices are bold upper case.

Panorama point (s,t) is derived from any perspective plane point (u.v).

The perspective plane has a focal length I from the center of projection.

In addition, the perspective plane can be arbitrarily rotated through a given view orientation, namely heading, pitch, and bank (h,p,b).

Any point in the perspective plane is specified by the 3D vector:

$$w = <u, v, l>$$

The rotations are applied by using a standard matrix-vector product. The three matrices accounting for Heading, Pitch and Bank are as follows:

$$H = \begin{vmatrix} \cos(h) & 0 & \sin(h) \\ 0 & 1 & 0 \\ -\sin(h) & 0 & \cos(h) \end{vmatrix}$$

$$P = \begin{vmatrix} 1 & 0 & 0 \\ 0 & \cos(p) & -\sin(p) \\ 0 & \sin(p) & \cos(p) \end{vmatrix}$$

$$B = \begin{vmatrix} \cos(b) & \sin(b) & 0 \\ -\sin(b) & \cos(b) & 0 \\ 0 & 0 & 1 \end{vmatrix}$$

The vector w is rotated using the above matrices to attain w' like such"

$$w' = H*P*B*w$$

The final step is converting from rectangular to spherical coordinates. Denoting the 3 components of the vector w'as x, y, z, then the conversion is:

$$s = a\tan 2(x,z)$$

$$t = a\tan 2(y, sqrt(x*x + z*z))$$

Note: a tan 2(a, b) is a standard C-function very similar to a tan(a/b), but a tan 2 correctly handles the different cases that arise if a or b is negative or if b is 0.

Optionally, the viewer may predict the next key-frame to be loaded (depending on user travel direction and speed), and pre-load this key frame in order to increase performance.

Due to the one to one ratio of key frames to possible user positions, there exists an exact correlation between frame rate and user motion speed. If the user is currently moving through the environment, every frame displayed is a new key frame, thus the faster the frame rate, the faster the user travels. For this reason, the frame rate is "capped" during user travel to eliminate the problem of excessive user travel speed. In order to retain smooth motion, the frame rate is not decreased to below standard video frame rates (15 frames/ sec.) The frame rate is not increased in order to keep the relative spacing of key frames to a manageable distance; the faster the frame rate, the closer the key frames must be to achieve the same user travel speed. The viewer may optionally skip key-frames in order to increase the user's travel speed through the environment. The more key-frames skipped, the faster the user will travel; if no key-frames are skipped, the user will travel at the slowest possible rate (given a constant frame rate.)

The system can link pan movie segments so as to permit branching and thereby follow a path selected by a user. Multiple linear (one dimensional) pan movies may be linked together to create a "graph" of pan movies (see appendix B). For each pan movie, the end of one segment may be associated with the start of a "next" pan movie. This association (in conjunction with the length of the individual pan movies) is the basis for the graph shape. In order to achieve smooth transitions, the "last" frame in the "first" pan movie must be the same as (or one frame off from) the "first" frame of the "next" pan movie. In addition to positional correctness, the relative view orientations of the joining frames must be known. For example, if the "last" frame of the "first" pan movie faces "north", and the "first" frame of the "next" Pan Movie faces "east", then the viewing software must be alerted to this orientation change. Without this information, there would be a 90 degree "snap" in the transition between the two Pan Movies. All this graph information may be stored in a separate file (text or binary form.)

The audio information associated with each frame of a pan movie must take into account the fact that a viewer of a pan movie has a great deal of control over what is presented on the screen. In addition to the ability to select branch points a user may choose to change the direction of view or to stop and backup. The audio information associated with each key frame must accommodate this flexibility.

As illustrated in FIG. 11, the audio information stored with each key frame includes five audio tracks designated A, B, C, D, E and control information. FIG. 11 shows eight key frames Fa to Fi each of which has five associated audio tracks and a control field. Audio track A is the track that is played if the pan movie is moving forward in the normal direction at the normal rate of thirty frames per second. Audio track B is the track that is played if the pan movie is being displayed in reverse direction. Audio track C is the audio track that is played if the movie is moving forward at half speed. Audio track D is the track that is played if the movie is being played in the reverse direction at one half speed. Finally audio track E is the track that is repeatedly played if the movie has stopped at one frame. Naturally a variety of other audio tracks could be added for use in a number of other situations. For example, tracks can point to audio clips or to other audio tracks.

The control information that is recorded with each frame controls certain special effects. For example the control information on one frame can tell the program to continue playing the audio tracks from the following frame even if the user has stopped the movie at one particular frame. As the sound track on each frame is played, the control information on that frame is interrogated to determine what to do next. What sound is played at any particular time is determined by a combination of the control information on the particular frame being viewed and the action being taken by the viewer at that time. From a programming point of view, the commands associated with each rack are de-compressed and read when the view window for the associated frame is de-compressed and read. As a particular view window is being displayed (or slightly before) the commands stored in the control field are read and executed so that the appropriate sound can be de-compressed and played when the view window is displayed.

For example the control information could provide the following types of commands:

Stop this audio track if user stops pan movie here (typical setting). If this is not set the audio will continue playing in same direction until audio for this track ends Start or continue to play this audio track if user is viewing pan movie in forward direction (typical setting)

Start or continue to play this audio track backwards if user if viewing pan move in a backwards direction. (note if the same audio information is played is reverse it may be distorted)

Start this audio track when image frames are in motion and being played in a reverse direction. This allows high quality audio to be played while reverse viewing Continue audio track from/on other file structure (branch most likely has occurred) modify volume This is used to fade out an audio track that may have played ahead earlier Stop all audio tracks Stop this audio track if user slows pan movie playback Start audio file X: where X is a conventional audio file that is separate from the pan movie.

A wide variety of other commands may be implements as desired by the designer of a particular movie.

The audio information can be recorded with a normal recorder when the initial images are recorded or it can be recorded separately. The audio data is merged with the key frames by computer 21. This can be done manually on a frame by frame basis or the process can be automated. When the sound is merged with the key frames the appropriate control information is added.

Figure 12A:
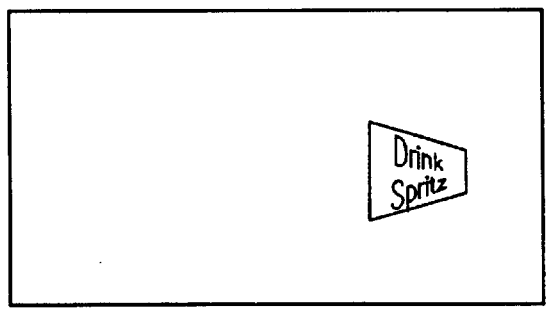
FIG. 12A, 12B and 12C are a spatial sequence of perspectively correct views illustrating movement past a billboard displaying an advertisement which has been superimposed into a scene as a hot spot.
Figure 12B:
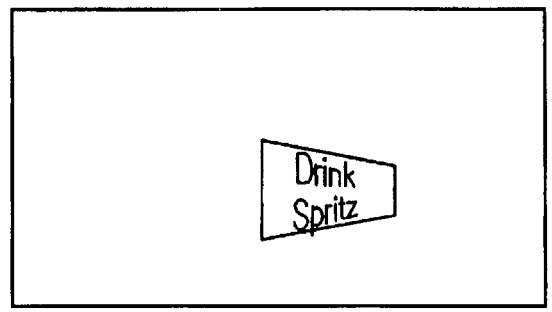
Figure 12C:
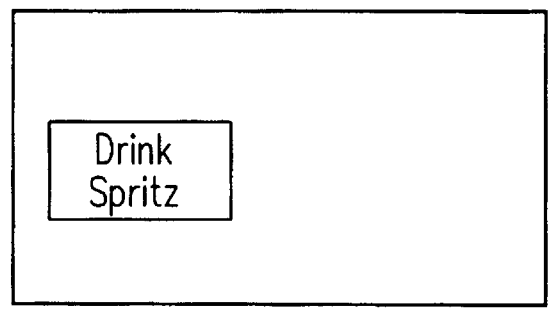

FIGS. 12A, 12B and 12C illustrate another aspect of the present invention. A hot spot on a key frame can contain and display information that is independent from, and in addition to the information in the base images which are used to form the panoramas. For example, as a pan movie simulates movement past a billboard, a "regular" motion picture (which might for example be an advertisement for a product) can be displayed on the billboard. The motion picture on the billboard would be integrated with the various key frames in the same manner as hot spots are added to key frames. As illustrated in FIG. 12A, 12B and 12C, such images displayed on a billboard passed which motion is simulated must be corrected for the fact that the viewer is not directly viewing the image when he is approaching it. The image is only rectangular when the viewer is adjacent the image as shown in FIG. 12C. As the viewer is approaching the image it is distorted as illustrated in FIGS. 12A and 12B.

The attached appendices provide computer programs which implement various aspects of the present invention. These programs are designed to run under a conventional operating system such as the "Windows" operating system marketed by the Microsoft Corporation.

The program given in Appendix A will retrieve frames for a move, correct the perspective in accordance with known equations and then display the images of the movie in sequence.

Appendix B is an example of a link control file for the frames of a pan movie. Appendix C is pseudocode showing how sequences of images are linked to form a pan movie.

Appendix D (on microfiche) is a printout of computer code for the following previously described three computer programs:"

1) A program which seams images and builds pan movies. This program takes six single view images and seams then into a panorama, and then connects a series of panoramic images into a pan movie.
2) A program which inserts hot spots into panoramas.
3) A program which displays a series of panoramic images as a pan movie.

It is noted that in a pan movie the frames do not all have to have the same resolution. Some frames may be of a higher resolution. For example, at the most interesting places in the Pan Movie may have a higher resolution.

Many alternative embodiments of the invention are possible. For example, the initial capture process could record the images on video tape rather than recording the images digitally. Electronic cameras could be used which include image capture devices other than CCD arrays to capture images. Branching can provide three or more optional paths rather than just two pats as shown in FIG. 4; and branching can provide for going left or right at an intersection.

It is noted that in alternative embodiments, compression schemes or techniques other than Intel Indio can be used. Furthermore, alternative embodiments could use no compression at all if enough storage and bandwidth were available.

While in the embodiment shown the images files are manually transferred between some of the units in the embodiment shown, in alternative embodiments these files could be transferred between units by electronic connections between the units.

While in the embodiment described above the camera has six lenses which record all six sides of the cube, in alternative embodiments the camera could record less than an entire sphere. For example the lens pointing down could be eliminated in some embodiments. Still other alternative embodiments could use lenses with wider or narrower fields of view. For example less lenses each with a wider field of view could be used. Furthermore, while the embodiment described above utilizes spherical panorama, other types of panoramas could be used. Various types of projections such as cubic could be used instead of equi-rectangular.

The embodiment shown includes a number of sound tracks with each key frame and control information which indicates which sound track should be played when the key frame is displayed depending on whether or not certain special conditions exist. Alternatively, there could be a single sound track associated with each frame. In such an embodiment the single sound track on each key frame could be the sounds recorded when the images is the particular frame were recorded. In other alternatively embodiments, there could be no sound tracks and in such case the images would be displayed without accompanying sound.

Having described and illustrated the principles of the invention in various embodiments thereof, it should be apparent that the invention can be modified in arrangement and detail without departing from the principles of the invention. We claim all modifications and variation coming within the spirit and scope of the following claims.

---

APPENDIX A: FRAME RETRIEVAL CODE

```
#include "windows.h"
#include "mmsystem.h"
#include "vfw.h"
#include "vfw_spec.h"
#define S_BMIH          sizeof(BITMAPINFOHEADER)
// Externally declared (and allocated) variables
extern UINT currentFrameNumber; // Current Pan Movie file frame number
(user position)
extern HANDLE hFile; // Open file handle of Pan Movie file
extern HIC hic; // Open IC handle (installed compressor)
extern DWORD *Index; // Pan Movie Frame Index (read from file at load
time)
extern LPBITMAPINFOHEADER viewFrame; // Buffer large enough to hold
image the size of the display window
extern LPBITMAPINFOHEADER panFrame; // Buffer large enough to hold
largest uncompressed frame
extern LPBITMAPINFOHEADER compressedFrame; // Buffer large enough to
hold largest compressed frame
// Function prototypes
extern void ViewToPan(int viewWidth,int viewHeight,int panWidth,int
panHeight,float heading,float pitch,float bank,float zoom,POINT *point);
static LPBITMAPINFOHEADER RetrievePanFrame(int frameNumber,RECT
*viewRect);
//
// This function generates a perspectively correct bitmap image given a
user view orientation and travel speed
//
static LPBITMAPINFOHEADER RetrieveViewFrame(float userHeading,float
userPitch,float userBank,float userZoom,int userTravelSpeed)
{
    // Determine Decode BoundingBox
    POINT point;
    RECT localDecompressionRect;
    // Upper left corner of viewFrame
    point.x = 0; point.y = 0;
ViewToPan(viewFrame->biWidth,viewFrame->biHeight,panFrame->biWidth, panFrame->biHeight,
userHeading,userPitch,userBank,userZoom,&point);
    localDecompressionRect.top         = point.y;
    localDecompressionRect.left        = point.x;
```

APPENDIX A: FRAME RETRIEVAL CODE

```
    // Upper right corner of viewFrame
    point.x = viewFrame->biWidth-1;
    point.y = 0;
ViewToPan(viewFrame->biWidth,viewFrame->biHeight,panFrame->bi Width,panFrame->biHeight,
userHeading,userPitch,userBank,userZoom,&point);
    localDecompression Rect.top        = min(localDecompressionRect.top,point.y);
    localDecompressionRect.right    = point.x;
    // Lower left corner of viewFrame
    point.x = 0; point.y = viewFrame->biHeight-1;
ViewToPan(viewFrame->biWidth,viewFrame->biHeight,panFrame->biWidth,panFrame->biHeight,
userHeading,userPitch,userBank,userZoom,&point);
    localDecompressionRect.bottom= point.y;
    localDecompressionRect.left       =
min(localDecompressionRect.left,point.x);
    // Lower right corner of viewFrame
    point.x = viewFrame->biWidth-1; point.y = viewFrame->biHeight-1;
ViewToPan(viewFrame->biWidth,viewFrame->biHeight,panFrame->biWidth,panFrame->biHeight,
userHeading,userPitch,userBank,userZoom,&point);
    localDecompressionRect.bottom=
max(localDecompressionRect.bottom,point.y);
    localDecompressionRect.right    =
max(localDecompressionRect.right,point.x);
    // Get Pan Frame (or "userDecompressionRect" portion thereof)
    currentFrameNumber += userTravelSpeed; // userTravelSpeed is negative
if traveling backwards
    LPBITMAPINFOHEADER pFrame =
RetrievePanFrame(currentFrameNumber,&localDecompression Rect);
    if(pFrame == NULL) {
        currentFrameNumber -= userTravelSpeed;
        return NULL;
    }
    // A very slow warping routine (assumes 24-bit pixels)
    LPBYTE    srcPixels       = ((LPBYTE)pFrame) +S_BMIH;
    LPBYTE    dstPixels       = ((LPBYTE)viewFrame) +S_BMIH;
    for(int y = 0; y < viewFrame->biHeight; y++) {
        for(int x = 0; x < viewFrame->biHeight; x++) {
            point.y = y; point.x = x;
ViewToPan(viewFrame->biWidth,viewFrame->biHeight,pFrame->biWidth,pFrame->biHeight,
userHeading,userPitch,userBank,userZoom,&point);
            memcpy(&dstPixels[3*(x + y*viewFrame->biwidth)],&srcPixels[3*(point.x
+ point.y*pFrame->biWidth)],3); // supports 24-Bit Pixels only
        }
    }
    return viewFrame
}
//
// This function reads and decompresses a Pan Frame bitmap image from a
Pan Movie file
//
static LPBITMAPINFOHEADER RetrievePanFrame(int frameNumber,RECT
*viewRect)
{
    DWORD d;
    UINT frameSize= Index[frameNumber+1]-Index[frameNumber];
    // Set the file pointer to the start of the requested frame and read in
the bitmap header
    SetFilePointer(hFile,Index[frameNumber],NULL,FILE_BEGIN);
    ReadFile(hFile,panFrame S_BMIH,&d,NULL);
    if(panFrame->biCompression == 0) {    // Uncompressed frame (read rest of
frame and return)
        ReadFile(hFile,((BYTE*)panFrame)+S_BMIH,frameSize-S_BMIH,&d,NULL);
        return panFrame;
    }
    // Read the remainder of the compressed frame
    *compressedFrame           = *panFrame;
ReadFile(hFile,((BYTE*)compressedFrame)+S_BMIH,frameSize-S_BMIH &d,NULL);
    // Set up decompressed bitmap header
    panFrame->biCompression         = 0;
    panFrame->biSizeImage           = 0;
    panFrame->biBitCount            = 24;
    panFrame->biClrUsed             = 0;
    LPBITMAPINFOHEADER biSrc = compressedFrame;
    LPBITMAPINFOHEADER biDst = panFrame;
    LPBYTE srcPixels           = (BYTE*)biSrc +S_BMIH;
    LPBYTE dstPixels           = (BYTE*)biDst +S_BMIH;
    // If the frame is compressed with Intel Indeo 4 and a local rect was
requested,then perform local decompression
```

-continued

APPENDIX A: FRAME RETRIEVAL CODE

```
    if(viewRect && biSrc->biCompression == mmioFOURCC('i','V','4','1')) {
// Intel Indeo 4.1
        R4_DEC_FRAME_DATA       StateInfo;
        memset(&StateInfo,0,sizeof(R4 DEC_FRAME_DATA));
        StateInfo.dwSize                = sizeof(R4_DEC_FRAME DATA);
        StateInfo.dwFourCC              = biSrc->biCompression;
        StateInfo.dwVersion             = SPECIFIC_INTERFACE_VERSION;
        StateInfo.mtType                = MT_DECODE_FRAME_VALUE;
        StateInfo.oeEnvironment         = OE_32;
        StateInfo.dwFlags               = DECFRAME_VALID |
DECFRAME_DECODE_RECT
        StateInfo.rDecodeRect.dwX       = min(viewRect->left,viewRect->right);
        StateInfo.rDecodeRect.dwY       = min(viewRect->top,viewRect->bottom);
        StateInfo.rDecodeRect.dwWidth   =
abs((viewRect->right-viewRect->left))+1;
        StateInfo.rDecodeRect.dwHeight=
abs((viewRect->bottom-viewRect->top))+1;
        ICSetState(hic,&StateInfo,sizeof(R4 DEC_FRAME DATA));
if(ICDecompressEx(hic,0,biSrc,srcPixels,0,0,biSrc->biWidth,biSrc->biHeight,biDst,dstPixels,0,0,
biDst->biWidth,biDst->biHeight)
!= ICERR_OK)
            return NULL;
    }
    else { // Decompress entire frame
if(ICDecompressEx(hic,0,biSrc,srcPixels,0,0,biSrc->biWidth,biSrc->biHeight,biDst,dstPixels,0,0,
biDst->biWidth,biDst->biHeight)
!= ICERR_OK)
            return NULL;
    }
    return panFrame;
{
© Infinite Pictures 1998
```

APPENDIX B: SAMPLE PAN MOVIE LINK CONTROL FILE

```
<----------------------------->
        <- C     |    B ->
                 |
                 |
                 |A
                 |
                 |
[Segment-A (start)]
File=       "A.pan"
North=      0
[Segment-A (end)]
File=       "A.pan"
North=      0
Link 90=    "Segment-B (start)"
Link 270=   "Segment-C (start)"
[Segment-B (start)]
File=       "B.pan"
North=      90
Link 90=    "Segment-A (end)"
Link 180=   "Segment-C (start)"
[Segment-B (end)]
File=       "B.pan"
North=      90
[Segment-C (start)]
File=       "C.pan"
North=      270
Link 270=   "Segment-A (end)"
Link 180=   "Segment-B (start)"
[Segment-C (end)]
File=       "C.pan"
North=      270
© Infinite Pictures 1998
```

APPENDIX C PSEUDOCODE FOR
LINKED PAN MOVIES (VIA CONTROL FILE)

```
GLOBAL FILE controlFile // Control file
GLOBAL STRING currentSegment // The name of the current pan movie
segment
GLOBAL INTEGER currentFrameNumber // The current frame number
of the current Pan Movie
GLOBAL    INTEGER currentHeading // The current user view
horizontal pan orientation
//
// This function will read the control file and determine which linked
segment is closest
// to the current user heading orientation
// It will also determine the new frame number of the new segment
//
BOOLEAN   RetrieveLink()
{
    INTEGER minAngle
    STRING nextSegment
    if currentFrameNumber == 0
        currentSegment = currentSegment + (start)
    else
        currentSegment = currentSegment + (end)
    if no links in section currentSegment of controlFile
        return FALSE
    minAngle         = link angle closest to currentHeading
    nextSegment      = GetString(minAngle)
    if AngleDifference(currentHeading,MinAngle) > 45 degrees
        return FALSE;
    INTEGER nextNorth = GetNorth(nextSegment)
    INTEGER currentNorth = GetNorth(currentSegment)
    currentHeading = currentHeading + (nextNorth - currentNorth)
    currentSegment = nextSegment
    if stringFind(currentSegment,"(end)")
        currentFrameNumber = -1
    else
        currentFrameNumber = 0
```

-continued

APPENDIX C PSEUDOCODE FOR
LINKED PAN MOVIES (VIA CONTROL FILE)

return TRUE
}
© Infinite Pictures 1998

I claim:

1. A system for displaying panoramic images which displays movement as observed by a viewer looking in a selected direction, comprising:
   a digital image capture device for capturing digital images;
   a processor for seaming the digital images into panoramic images and linking the panoramic images into a sequence of panoramic images; and
   a viewer for displaying a view window into selected ones of the sequence of panoramic images at a frame rate that simulates motion.

2. The system recited in claim 1 wherein the digital image capture device is a camera that has six lenses, one positioned on each side of a cube.

3. The system recited in claim 1 wherein the digital image captured device is moving in space while said images are being captured.

4. The system in claim 1 wherein said images are displayed at a frame rate above 15 frames per second.

5. A method of displaying panoramic images, comprising:
   capturing a plurality of digital images;
   seaming the images into panoramic images and linking the panoramic images into a sequence of panoramic images; and
   displaying a window into selected ones of the sequence of panoramic images at a frame rate that simulates motion.

6. The method recited in claim 5 wherein the plurality of digital images are captured by a camera that has six lenses, one positioned on each side of a cube.

7. The method recited in claim 5 wherein the portion of each panorama image that is viewed is selected by an operator who indicates a direction of view.

8. The method recited in claim 5 wherein said sequence of panoramic images has break points which provide at least two alternative sequences of images.

9. The method recited in claim 5 wherein the sequence of panoramic images displayed after a break point is selected in response to input from a user.

10. The method recited in claim 5 wherein sound is associated with at least one of the panoramic images.

11. A three dimensional (3-D) panorama movie for enabling a user interactively to view movement through a three-dimensional space along a path through a series of viewpoints and to view in any viewing direction in the three-dimensional space, the 3-D panorama movie comprising:
   a computer storage medium for storage of machine readable image data;
   a file of machine readable image data stored on the storage medium, the image data including a plurality of panorama frames forming a sequence of images of the three dimensional space in which each image in the sequence has a spatially different viewpoint; and
   a panframe directory stored on the storage medium in association with the file of machine readable image data, containing a set of frame indexes, each frame index identifying a location in the file of one of the panorama frames,
   whereby said panorama frames can be displayed in a sequence determined by said frame index to simulate motion.

12. A method of displaying movement of objects in multidimensional space comprising the steps of:
   capturing a series of sets of individual images with a multi lens camera, each set of images covering at least a portion of a spherical view, said camera moving relative to said objects as said images are captured,
   transferring said images to a computer,
   seaming the images in each set of images into a panorama,
   said panoramas being indexed in the sequence in which the images which formed the panoramas were captured, and,
   displaying a view window into said panoramas in the same sequence as the sequence in which they were captured at a frame rate that simulates motion.

13. A computer-readable medium having stored thereon instructions, which, when executed by a processor in a system for displaying panoramic images, cause the processor to perform the operations of:
   capturing a plurality of digital images;
   seaming the images into panoramic images and linking the panoramic images into a sequence of panoramic images; and
   displaying a view window into selected ones of the sequence of panoramic images at a frame rate that simulates motion.

14. The computer-readable medium of claim 13, wherein the plurality of digital images are captured by a camera that has six lenses, one positioned on each side of a cube.

15. The computer-readable medium of claim 13, wherein the portion of each panorama image that is viewed is selected by an operator who indicates a direction of view.

16. The computer-readable medium of claim 13, wherein said sequence of panoramic images has break points which provide at least two alternative sequences of images.

17. The computer-readable medium of claim 13, wherein the sequence of panoramic images displayed after a break point is selected in response to input from a user.

18. The computer-readable medium of claim 13, wherein sound is associated with at least one of the panoramic images.

19. The system of claim 1, wherein the digital images are compressed at the digital capture device, and portions of the panoramic images which correspond to the view window are decompressed and displayed in the view window.

20. The system of claim 1, wherein the orientation of the panoramic images are adjusted to provide a desired motion effect.

21. The system of claim 1, wherein at least one hot spot is included in at least one panoramic image.

22. The system of claim 21, wherein the hot spot is automatically triggered by a user's location in the panoramic image relative to the hot spot.

23. The system of claim 1, wherein a portion of a panoramic image is selected for a view window based on a current user position and direction of travel in the panoramic images.

24. The system of claim 1, wherein segments of multiple sequences of panoramic images are linked to allow a user to follow a selected path in the multiple sequences of panoramic images.

25. The system of claim 1, wherein control information is associated with at least one panoramic image to control special effects in the sequence of panoramic images.

26. A system for displaying partial panoramic images, comprising:

a digital image capture device for capturing digital images;

a processor for seaming portions of selected ones of the digital images into partial panoramic images; and a viewer for displaying a view window into the partial panoramic images at a frame rate that simulates motion.

27. A method of displaying partial panoramic images, comprising:

capturing a plurality of digital images;

seaming portions of selected ones of the digital images into partial panoramic images; and displaying a view window into the partial panoramic images at a frame rate that simulates motion.

28. A computer-readable medium having stored thereon instructions, which, when executed by a processor in a system for displaying partial panoramic images, cause the processor to perform the operations of:

capturing a plurality of digital images;

seaming portions of selected ones of the digital images into partial panoramic images; and displaying a view window into the partial panoramic images at a frame rate that simulates motion.

* * * * *

UNITED STATES PATENT AND TRADEMARK OFFICE
CERTIFICATE OF CORRECTION

PATENT NO. : 6,654,019 B2  Page 1 of 1
DATED : November 25, 2003
INVENTOR(S) : Scott Gilbert et al.

It is certified that error appears in the above-identified patent and that said Letters Patent is hereby corrected as shown below:

Column 21,
Lines 17 and 33, please insert -- fixed -- after "into a".
Lines 19 and 20, please replace "selected ones of the" with -- the fixed --.
Line 35, please replace "selected ones of the" with -- the fixed --.

Column 22,
Line 18, please add a comma after "panoramas".
Line 27, please insert -- fixed -- after "into a".
Line 29, please replace "selected ones of the" with -- the fixed --.

Column 23,
Line 4, please replace "partial" with -- portions of --.
Line 6, please insert -- a fixed sequence of -- after "capturing".
Line 8, please replace "selected ones of the" with -- the fixed sequence of --.
Lines 9, 10 and 13, please replace "partial" with -- portions of --.
Line 15, please replace "plurality" with -- fixed sequence --.

Column 24,
Lines 1 and 10, please replace "selected ones of the" with -- the fixed sequence of --.
Lines 2, 3, 7, 11 and 12, please replace "partial" with -- portions of --.
Line 9, please replace "plurality" with -- fixed sequence --.
Line 13, please add:
-- 29. The system of claim 26, wherein the processor seams the portions of the fixed sequence of digital images into portions of panoramic images on the fly and displays a view window into the portions of panoramic images at a frame rate that simulates motion. --

Signed and Sealed this

Third Day of February, 2004

JON W. DUDAS
*Acting Director of the United States Patent and Trademark Office*